(12) United States Patent
Haroun et al.

(10) Patent No.: US 10,201,766 B2
(45) Date of Patent: Feb. 12, 2019

(54) COMPACT DISTRIBUTOR TRAY FOR OFFSHORE GAS/LIQUID CONTACT COLUMNS

(71) Applicant: IFP Energies nouvelles, Rueil-Malmasion (FR)

(72) Inventors: Yacine Haroun, Davis, CA (US); Pascal Alix, Roussillon (FR); Manel Fourati, Lyons (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 195 days.

(21) Appl. No.: 14/973,237

(22) Filed: Dec. 17, 2015

(65) Prior Publication Data
US 2016/0175733 A1 Jun. 23, 2016

(30) Foreign Application Priority Data

Dec. 17, 2014 (FR) ...................................... 14 62559

(51) Int. Cl.
*B01D 53/18* (2006.01)
*B01D 3/32* (2006.01)
(Continued)

(52) U.S. Cl.
CPC ............. *B01D 3/324* (2013.01); *B01D 3/008* (2013.01); *B01D 3/24* (2013.01); *B01D 53/185* (2013.01);
(Continued)

(58) Field of Classification Search
CPC .......... B01D 3/008; B01D 3/24; B01D 3/324; B01D 53/185; B01F 3/04078; B01F 3/04496; B63B 35/44
(Continued)

(56) References Cited

U.S. PATENT DOCUMENTS

| 3,524,731 A | 8/1970 | Effron et al. |
| 3,958,964 A * | 5/1976 | Koch ....................... B01D 3/20 |
| | | 261/114.1 |

(Continued)

FOREIGN PATENT DOCUMENTS

| JP | 55-3819 | * 1/1980 |
| WO | 2005/063352 A1 | 7/2005 |

OTHER PUBLICATIONS

Preliminary Search Report for French Application No. 14/62.559 dated Sep. 24, 2015 (10 pages).

*Primary Examiner* — Charles S Bushey
(74) *Attorney, Agent, or Firm* — Fitch, Even, Tabin & Flannery LLP

(57) ABSTRACT

The invention is a distributor tray for at least one a gas/liquid heat and a material exchange column comprising passages for passing gas through the tray. The tray has an upper plate (P1) and a lower plate (P2) with each plate having at least two distinct liquid passages. The openings (10 and 11) of the upper plate (P1) are positioned at distinct elevations with at least one of the liquid passages (10) of upper plate (P1) having a lower elevation communicating with one of the liquid passages of the lower plate through a supply line (9). The invention also relates to a gas/liquid heat and/or material exchange column equipped with a distributor tray (2) in accordance with the invention and to a floating barge having a column and to the use of the column.

18 Claims, 5 Drawing Sheets

(51) Int. Cl.
  *B01D 3/00*  (2006.01)
  *B01D 3/24*  (2006.01)
  *B01F 3/04*  (2006.01)
  *B63B 35/44*  (2006.01)

(52) U.S. Cl.
  CPC ...... *B01F 3/04078* (2013.01); *B01F 3/04496* (2013.01); *B63B 35/44* (2013.01)

(58) Field of Classification Search
  USPC .......................................... 261/114.1, 114.5
  See application file for complete search history.

(56) References Cited

U.S. PATENT DOCUMENTS

| | | | |
|---|---|---|---|
| 4,311,564 A * | 1/1982 | Aldridge | B01D 3/22 202/158 |
| 4,543,219 A | 9/1985 | Yamato et al. | |
| 5,132,055 A * | 7/1992 | Alleaume | B01D 3/008 261/114.5 |
| 5,683,629 A | 11/1997 | Konijin | |
| 5,837,105 A * | 11/1998 | Stober | B01D 1/30 202/158 |
| 6,053,484 A | 4/2000 | Fan et al. | |
| 6,436,245 B1 | 8/2002 | Nishimura et al. | |
| 6,631,892 B1 * | 10/2003 | Erickson | B01F 3/04496 261/114.1 |
| 7,234,692 B2 * | 6/2007 | Dichtl | B01D 3/008 261/114.2 |
| 7,931,871 B2 * | 4/2011 | Nascimento | B01D 3/20 202/153 |
| 8,408,026 B2 * | 4/2013 | Kovak | B01D 3/008 202/158 |
| 8,960,652 B2 * | 2/2015 | Zaman | B01D 3/28 261/114.4 |
| 2008/0271983 A1 | 11/2008 | Alzner et al. | |
| 2012/0175792 A1 * | 7/2012 | Nieuwoudt | B01D 3/008 261/128 |
| 2013/0277868 A1 | 10/2013 | Haroun et al. | |
| 2013/0277869 A1 * | 10/2013 | Haroun | B01F 3/04496 261/114.5 |

* cited by examiner

COMPACT DISTRIBUTOR TRAY FOR OFFSHORE GAS/LIQUID CONTACT COLUMNS

CROSS REFERENCE TO RELATED APPLICATION

Reference is made to French Patent application Ser. No. 14/62,559 which is incorporated herein by reference in its entirety.

BACKGROUND OF THE INVENTION

Field of the Invention

The present invention relates to the field of offshore gas/liquid contact columns, and more particularly to offshore gas treatment, $CO_2$ capture, dehydration or distillation units.

Description of the Prior Art

Offshore gas treatment and/or $CO_2$ capture units using an amine washing processes comprise liquid or gaseous fluid absorption and regeneration columns. These columns operate under counter-current or co-current gas/liquid flow conditions and are installed on vessels, floating barges or offshore platforms, of the FPSO (Floating Production, Storage and Offloading) or the FLNG (Floating Liquefied Natural Gas) type for example. Distillation columns or dehydration columns can also be installed on floating barges.

The columns used in these offshore gas treatment and/or $CO_2$ capture and/or distillation and/or dehydration units are generally based on the principle of material and/or heat exchange between the gas and the fluid that circulate in the columns. FIG. 1 shows a particular case of a gas treatment column 1 equipped with a distributor tray at the column top. Conventionally, this gas treatment column 1 comprises several sections filled by a contactor 3, and a distributor tray 2 is arranged above each section. The gas/liquid contactor contacts gas G with liquid L to provide exchanges.

The standard distributors 2 used in absorption/regeneration or distillation columns generally have a collector/distributor tray equipped with chimneys 4 (see FIG. 2). Distribution of the liquid occurs through passage thereof in orifices 5 positioned in the bottom of tray 2 and distribution of the gas occurs through chimneys 4. Each chimney 4 allows passage of the gas, according to the counter-current or co-current operating mode, from the lower part of the column to the upper part of column 1, or from the upper part to the lower part. Chimneys 4 project from one side of tray 2 and are perpendicular thereto. Each chimney 4 has walls, which may be parallelepipedic or cylindrical, which define an inner volume that is open on either side of tray 2. In order to prevent the liquid from passing through chimneys 4, the gas outlet or inlet opening above the tray (depending on the counter-current or co-current operating mode) is preferably orthogonal to the longitudinal direction of chimney 4. The purpose of the distributor tray is to distribute liquid L homogeneously onto gas/liquid contactor 3.

The trays equipped with chimneys can be of different types and the chimneys can be positioned according to different configurations. Different distributor tray variants are described notably in the following U.S. patents and published application 6,338,774, 2,004,020,238, 6,149,136 and 5,752,538.

The gas/liquid contact columns are placed on floating structures, a vessel, platform or barge and are sensitive to wave motion. The equipments installed on these units, notably gas/liquid distributor trays, therefore undergo wave motions up to six degrees of freedom ("yaw, pitch, roll, heave, sway, thrust").

By way of example, the angle associated with the combination of the pitch and roll oscillations can be of the order of +/−8° with a period from 10 to 20 s. The orders of magnitude of the longitudinal, transverse and vertical accelerations encountered in the column are of the order of 0.2 to 0.5 m/s², 0.8 to 1.5 m/s² and 0.2 to 0.5 m/s² respectively at 50 m above the deck.

Under such conditions, the operation of conventional distributor trays equipped with chimneys (FIG. 2) can be greatly disturbed. Indeed, the operation of these distributors is mainly based on gravity flow, and a liquid guard level of homogeneous height "h" has to form on the distributor tray. The square of the velocity of flow of the liquid through orifices 5 in the bottom of tray 2 is proportional to the height of the liquid guard level ($U_L^2 \propto gh$). When tray 2 is inclined under the effect of the wave motion (FIG. 3), the height of the liquid level is no longer uniform on the distributor tray ($h_1 > h_2$), which causes an imbalance in the distribution of liquid at the inlet of gas/liquid contactor 3. The distribution quality and thus the efficiency of the column are greatly impacted. This poor distribution, if it is not controlled, can substantially degrade the performance of the column. A great liquid guard height would be necessary to make up for these effects, which means bulk and weight increase that is not suitable for offshore units. Liquid guard is understood to be the interface between gas and liquid. The liquid guard height corresponds to the level of liquid with respect to the upper face of the tray.

In order to avoid this type of problem, distribution elements which are relatively insensitive to not being horizontal have been used. These distributors generally have a collector and a distributor connected by one or more relatively long vertical lines so that the distributor remains under charge regardless of the wave motion conditions that are encountered. These distributors are generally relatively insensitive to the effects of the wave motion and they generate a good distribution quality. However, they are very bulky and can be several meters high in some cases (See published U.S. Application 2,004,020,238).

Another solution to these problems is described in French patent 2,771,018 corresponding to U.S. Pat. No. 6,294,053 and French Patent 2,771,019 corresponding to U.S. Pat. No. 6,395,138. Two distributors are used which are primary and secondary. Each distributor is divided into several compartments in which the liquid spreads. These compartments allow the liquid to be better distributed in case of inclination of the column. However, this option remains cumbersome because it requires two distributors. Moreover, the compartments do not communicate with one another, so that the liquid is not evenly distributed in the compartments.

U.S. Pat. No. 5,132,055 discloses a distributor tray wherein the chimneys allow the liquid flow zone to be partitioned. The chimneys are then all parallel. The compartments therefore all have a different surface area. Moreover, the parallel arrangement of the chimneys does not ensure good supply and good distribution of the liquid over the entire tray. Indeed, when the inclination of the tray is parallel to these chimneys, the liquid guard level varies significantly between the two ends of the tray.

French patent application 2,989,595, corresponding to U.S. published patent application 2013/277,868, describes a distributor tray comprising perforated walls that define compartments. The perforated walls limit the poor liquid distribution.

SUMMARY OF THE INVENTION

The invention relates to a distributor tray comprising at least two liquid collection and distribution levels. For high liquid flow rates, part of the liquid flows from the upper level to the lower level prior to being distributed from the tray to a packed bed through at least one opening provided at the base of the lower level. Another part of the liquid contained in the upper level is directly distributed to the base of the lower level. The goal of the invention is to improve the operating flexibility in case of a wide variation range of the liquid flow rate, while having a reduced overall size.

The present invention thus relates to a distributor tray for a gas/liquid heat and/or material exchange column comprising means allowing passage of the gas through the tray. The tray comprises an upper plate and a lower plate. Each one of the plates comprises at least two distinct means allowing passage of the liquid through the plate. The openings of the means of the upper plate are positioned at distinct elevations with at least one of the means of the upper plate having the lower elevation communicating with one of the means allowing passage of the liquid of the lower plate through a supply line.

According to a preferred embodiment of the invention, one of the means allowing passage of the liquid through the upper plate can be chimneys projecting from the upper face of the upper plate.

Advantageously, the means of the upper and lower plates which communicate through the line passing the liquid can have orifices provided in the plates.

Preferably, one of the means passing the liquid through the upper plate can have orifices provided in the upper plate.

According to a preferred embodiment of the invention, the means for passing gas can be gas distribution elements of cylindrical, cubic or parallelepipedic shape.

Preferably, the means for passing gas can be gas distribution elements formed on chimneys projecting from the upper face of the lower plate and passing through the upper plate.

According to an embodiment of the invention, the half-space formed above the first plate, which is referred to as the first level, can be divided into compartments by at least one wall perpendicular to the upper face of the first plate. The walls of the first level comprise at least one perforation allowing part of the liquid to flow between the compartments of the first level. The closed space contained between the first and second plates, which is referred to as second level, is divided into compartments by at least one wall.

According to an embodiment of the invention, the first level of the tray can comprise intersecting walls.

Preferably, the walls of the first level can be two series of walls with the walls of each series being parallel to one another and intersecting the walls of the other series.

More preferably, the walls of the second level can be symmetrical to the walls of the first level with respect to the upper plate.

According to an embodiment of the invention, the perforations of two parallel walls of the first level which define a single compartment, may not be aligned.

Preferably, the perforations can be provided at the base of the walls of the first level.

Advantageously, the height of the walls of the first level can be greater than or substantially equal to the height in the first level of the means for distributing gas.

According to an embodiment of the invention, dimensions $L_{c1}$ and $L_{c2}$ of a compartment of the first level can range between 100 and 1000 mm.

According to an embodiment of the invention, the first level can comprise at least one retention compartment arranged on the periphery of the distributor.

Furthermore, the invention relates to a gas/liquid heat and/or material exchange column wherein the two fluids are contacted by a packing. The column comprises at least one distributor tray according to the invention for distributing the fluids on the packing.

The invention also relates to a floating barge, notably for hydrocarbon recovery, which comprises at least one column according to the invention.

The invention furthermore relates to the use of a column according to the invention for a gas treatment, $CO_2$ capture, distillation or air conversion process.

BRIEF DESCRIPTION OF THE DRAWINGS

Other features and advantages of the method according to the invention will be clear from reading the description hereafter of embodiments given by way of non-limitative example, with reference to the accompanying figures wherein.

DETAILED DESCRIPTION OF THE INVENTION

Figure 1:
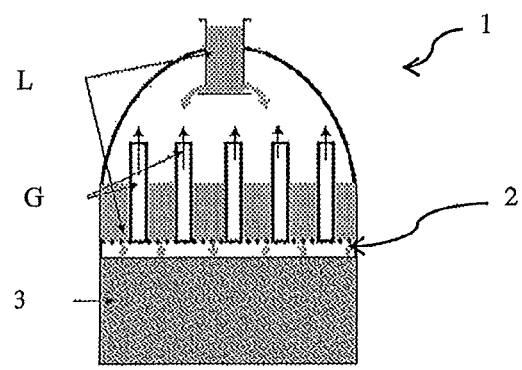
FIG. 1, already described, illustrates the particular case of a prior art gas treatment or $CO_2$ capture column equipped with a distributor tray at the column top.
Figure 2:
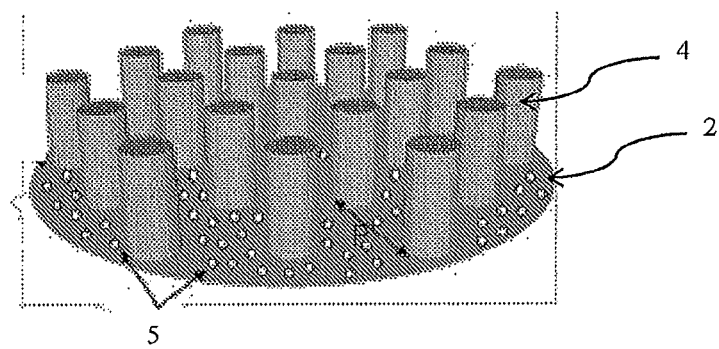
FIG. 2, already described, illustrates a distributor tray according to the prior art.

The invention relates to a distributor tray for a gas/liquid heat and/or material exchange column comprising means for passing the gas through the tray, an upper plate and a lower plate wherein each one of the plates comprises at least two distinct means for passing of the liquid through the plate.

According to the invention, the openings of the means of the upper plate are positioned at distinct elevations, and at least the means of the upper plate which are lower in elevation communicate with one of the means for passing of the liquid of the lower plate through a supply line.

The upper plate is understood to be the plate of the tray according to the invention having the higher elevation and the lower plate is understood to be the plate of the tray according to the invention having the lower elevation. The elevations are defined with respect to the tray being in a non-inclined position and along a vertical axis passing through the plates that form the tray.

According to the invention, a first means for passing liquid, hereafter referred to as "means with an upper opening", of the upper plate comprises an opening with an elevation which is higher than the elevation of an opening of a second means of the upper plate hereafter referred to as "means with a lower opening".

According to the invention, the means having a lower liquid passage opening of the upper plate communicates with a means for passing the liquid of the lower plate through a supply line.

According to the invention, the means providing gas distribution through the tray passes through both the upper and lower plates of the tray.

Thus as described, the invention comprises two liquid collection and distribution levels which are:

A first level, which is hereafter referred to as upper level has a half-space formed above the upper plate where the liquid coming from the gas treatment column is collected and distributed via at least two means for passing of liquid through the upper plate;
  a first means, with an upper opening, for passing of the liquid contained in the upper level through the upper plate,
  a second means, with a lower opening, which is extended by a line to a means of the lower plate for passing the liquid through the lower plate, for passing of the liquid contained in the upper level below the lower plate. Thus, part of the liquid contained in the upper level flows through the entire tray, A second level, which is hereafter referred to as lower level, has a space formed between the two plates where the liquid coming from the upper level flows through the means of the upper opening for passing the liquid contained in the upper level through the upper plate is collected and distributed via a means for passing of the liquid through the lower plate. According to an embodiment of the invention, the lower level of the tray is only supplied with liquid through the means with the upper opening provided in the upper level.

Thus as described, the distributor tray according to the invention permits part of the liquid contained in the upper level to flow through the entire tray via a supply line linking the two plates, and another part of the liquid is first distributed in the lower level of the tray prior to being distributed below the tray.

Figure 4:
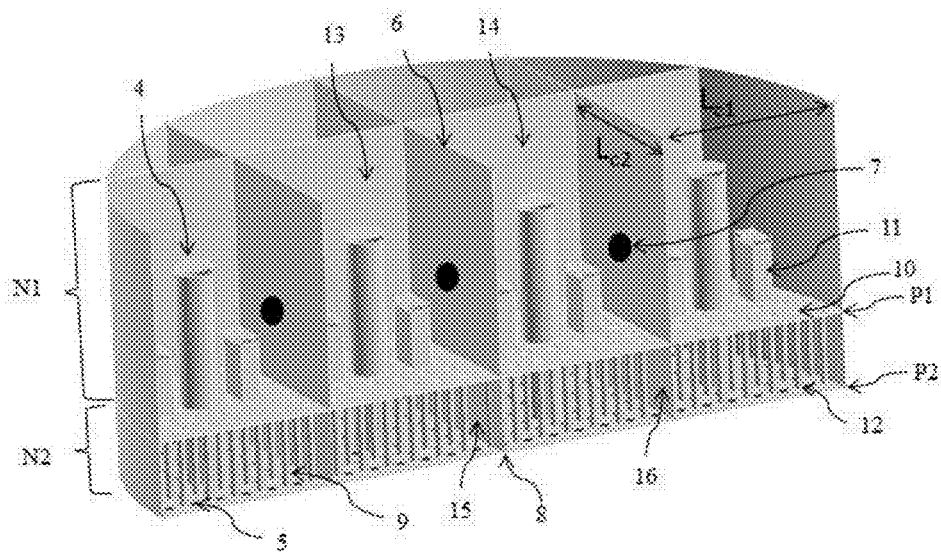
FIG. 4 illustrates a partial view of a distributor tray according to an embodiment of the invention.

FIG. 4 illustrates a distributor tray 2 according to an embodiment of the present invention. It is an isometric view of a tray cut along a diameter of the tray. The other part of the tray is determined by consideration of symmetry, with a wall at the level of the cutting plane. FIG. 4 describes a distributor tray 2 having an upper plate P1 and a lower plate P2 defining an upper level N1 and a lower level N2. Liquid passage means 11 having an upper opening on upper plate P1 whose elevation is higher than the elevation of the opening of second means for passing liquid 10 having a lower opening on the upper plate. The liquid passage means having the lower opening 10 on the upper plate P1 communicates with a means 12 for passage of the liquid on lower plate P2 through a supply line 9. Means 4 for distributing of the gas through the tray passes through both upper plate P1 and lower plate P2 of the tray.

Figure 6:
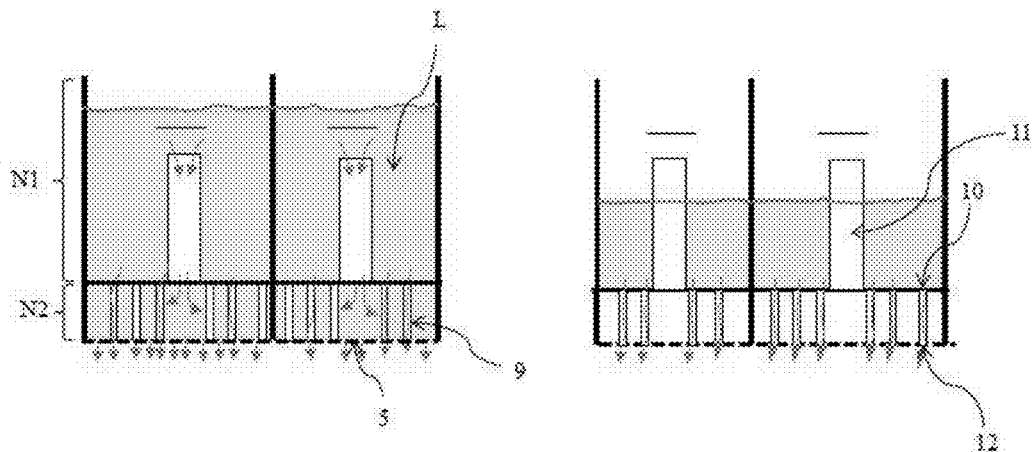
FIG. 6 illustrates the operation of a distributor tray according to an embodiment of the invention as a function of the liquid flow rate.

As described, the present invention provides a distributor tray having good flexibility suited for varying flow rates. Indeed, when the liquid flow rate is high, the liquid guard height in upper level N1 on tray 2 (liquid height in relation to the base of upper level N1 of the tray, therefore in relation to upper plate P1) is high and it can be above means 11 for passing liquid of the upper plate (mode referred to as nominal, FIG. 6a); part of the liquid of upper level N1 is then distributed via the means 11 in lower level N2, and the other part of the liquid of upper level N1 is directly distributed below the distributor tray via line 9 running through lower level N2. In the case of low liquid flow rate, the liquid level contained in the upper level N1 can be below the opening of chimney 11 (mode referred to as turn-down, FIG. 6b). The liquid contained in upper level N1 is then directly distributed below the distributor tray via line 9 running through lower level N2. Thus, in turn-down mode, no liquid is contained in lower level N2 of the tray. Thus, the present invention maintains a sufficiently high liquid guard so that the liquid distribution quality is not degraded under the effect of oscillations due to the wave motion.

Thus, with the two opening levels of liquid passage means 10 and 11 of upper level N1 and a lower collection and distribution level N2 acting as a liquid guard height regulator in case of high flow rates, the distributor tray according to the invention enables better operating flexibility than the prior art (for example compared to French patent 2,989,595 corresponding to published U.S. Application 2013/277,868 while satisfying a minimum space requirement (for example compared to French patent applications 2,771,018 and 2,771,019 that require two distinct trays which are a primary tray and a secondary tray. Therefore, the height of the lower level of the distributor tray according to the invention can be very small to be on the order of centimeters.

Advantageously, passage of the liquid from upper level N1 through the entire tray (i.e. without being distributed in lower level N2) is provided by a supply line 9 in which one end is an orifice 10 piercing in the upper plate P1 and the other end is an orifice 12 piercing the lower plate P2. Preferably, lines 9 have a cylindrical shape, but they can have a triangular or square section. Orifices 10 and 12 of each line then have matching shapes. Furthermore, lines 9 can have the same size or different sizes. Orifices 10 and 12 of each line 9 can have matching dimensions. Lines 9 can have a triangular or square cross section.

Preferably, means 5 for passing the liquid contained in lower level N2 through lower plate P2, therefore are below the distributor tray and have orifices piercing lower plate P2. Orifices 5 can have a triangular or square cross section. Orifices 5 can have the same size or different sizes.

According to an embodiment of the invention, plates P1 and P2 are horizontal, are parallel to one another and are separated by a distance h. In this case, the length of the line 9 is equal to distance h between the two plates P1 and P2. According to an embodiment of the present invention, the distance h between plates P1 and P2 of the tray ranges between 30 and 500 mm and preferably ranges between 50 and 200 mm.

According to a feature of the invention, the means for distributing gas 4 can be cylindrical, cubic, parallelepipedic shape, or they can have any other similar shape. According to an embodiment of the invention, the means for passing gas are chimneys 4. Furthermore, the cross section of the chimneys 4 on the tray can be triangular or square.

According to an embodiment of the present invention, the means 11 of the upper opening for passing of the liquid contained in upper level N1 towards the lower level N2 can have different heights and/or they comprise lateral openings at different heights to enhance flexibility of the distributor tray.

According to an embodiment of the present invention, the openings of the means 11 having an upper opening for passing the liquid contained in upper level N1 towards lower level N2 can be slots or orifices.

The height of the means 11 of the upper opening for passing of the liquid contained in upper level N1 towards lower level N2 is advantageously less than the height of chimneys 4 for passing gas.

According to an embodiment of the present invention, the means for passing liquid 11 can have different shapes such as cylindrical, cubic, parallelepipedic, or any similar shape.

Preferably, means 11 for passing of the liquid contained in upper level N1 towards lower level N2 are chimneys.

According to an embodiment of the present invention, the upper level N1 is partitioned by arranging at least one wall 6 on the upper face of upper plate P1, and lower level N2 is partitioned by arranging at least one wall 8 on the upper face of lower plate P2. Walls 6 of upper level N1 provide liquid compartments 13 and 14 that act as "barriers" when the tray is inclined. Walls 8 of lower level N2 generate liquid compartments 15 and 16 which allow the lateral motion of the liquid to be stopped so that the compartment remains under charge when the tray is inclined, in the case of high fluid flow rates. Furthermore, the walls of the upper level comprise at least one perforation 7 for fluid to flow between compartments 13 and 14 of upper level N1, which provides good radial distribution of the liquid on the entire upper level N1 of the distributor tray. Perforations 7 can be circular, oblong, rectangular, etc. However, the surface area of perforations 7 can preferably remain small in relation to the surface area of the walls of the upper level so that walls 6 of upper level N1 continue to fulfill their main function which is to limit the amount of fluid flowing on the upper level of the tray in order to guarantee good homogeneity of the liquid height on the upper level of the tray. A relatively homogeneous liquid guard is thus maintained even with a great inclination. Thus, a good quality of liquid distribution on the gas/liquid contactor is guaranteed.

According to an embodiment of the present invention, walls 8 of lower level N2 are symmetrical relative to walls 6 of upper level N1 of the upper plate P1. The number of compartments in the two levels is identical and the compartments of the lower level 15 and 16 have the same lateral limits as compartments 13 and 14 of upper level N1.

Figure 3:
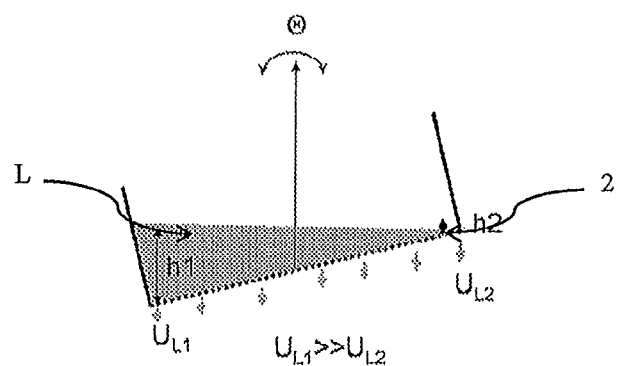
FIG. 3, already described, illustrates an inclined distributor tray according to the prior art.
Figure 5:
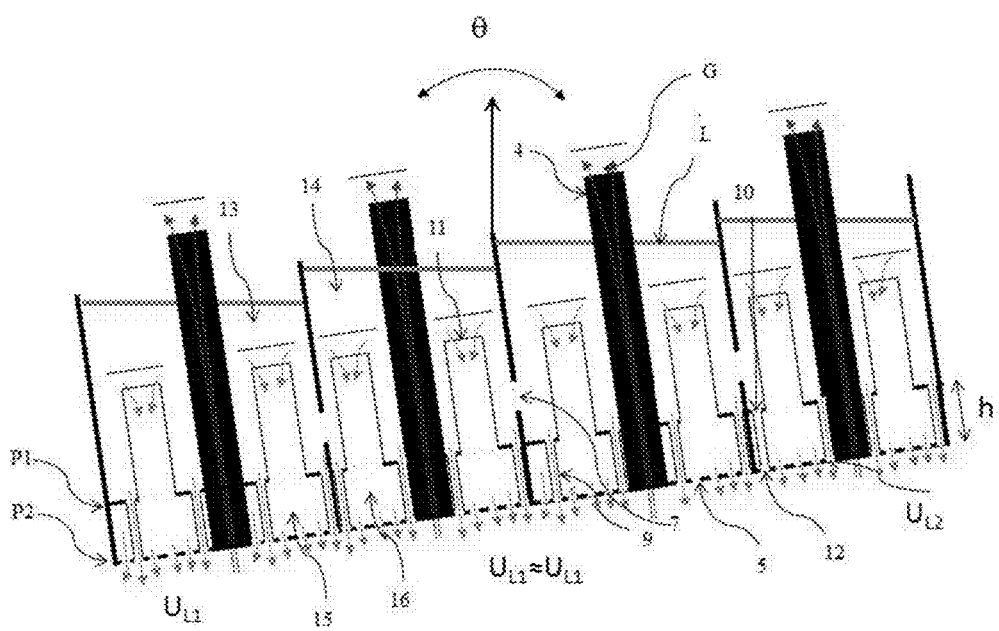
FIG. 5 illustrates a distributor tray in an inclined position according to an embodiment of the invention.

FIG. 5 illustrates a distributor tray in an inclined position comprising two liquid collection and distribution levels N1 and N2 each having four compartments of the same dimensions, and compartments 13 and 14 of upper level N1 can communicate via perforations 7 provided in walls 6 of the compartments. By comparison with FIG. 3, the liquid guard height varies less and therefore the liquid outlet velocities $U_{L1}$ and $U_{L2}$ do not differ substantially. The distribution is therefore more homogeneous than with the distributor tray according to the prior art.

According to an embodiment of the present invention, chimneys for passing gas through the entire tray are disposed in some of the compartments. According to another embodiment of the present invention, a chimney for passing of the gas through the entire tray is disposed in each compartment of the upper level N1 and extends into lower level N2, down to the base of lower plate P2 of the tray.

According to a preferred embodiment of the invention, at least one means 11 with an upper opening for passing of the liquid through upper plate P1 is provided in each compartment of upper level N1.

According to a preferred embodiment of the invention, each compartment 13 and 14 of upper level N1 comprises at least one and preferably more means 10 for passing of the liquid contained in upper level N1, which is extended by a line 9 running through lower level N2, with a line ending in a means 12 for passing of the liquid through lower plate P2.

According to the embodiment of the invention illustrated in FIG. 4, walls 6 and 8 of collection and distribution levels N1 and N2 are distributed into two series (or sets) of walls. In each series, the walls are parallel to one another and evenly spaced out by a length $L_{c1}$, and intersecting the walls of the other series that are evenly spaced out by a length $L_{c2}$. Thus, collection and distribution compartments 13 and 14 of the upper level and collection and distribution compartments 15 and 16 of the lower level substantially are shaped as a parallelogram and, according to the example as shown, as a rectangle. Advantageously, according to this embodiment, the height of walls 6 is greater than, smaller than or substantially equal to the height of chimneys 4 in the upper level. This height is sufficient to provide good distribution quality while limiting the space requirement. Each distribution compartment 13 and 14 of upper level N1 and its symmetrical compartments 15 and 16 in lower level N2 comprises a single gas chimney 4. According to this embodiment, a spacing $L_{c1}$ and $L_{c2}$ which is substantially equal to the distance between two neighboring chimneys can be selected.

According to an embodiment of the invention, a maximum distance with $L_{c1\_max}$ (in mm)=1 or 2, between two consecutive walls is calculated with a formula of the type:

$$L_{ci\_max} = \frac{50}{2\tan\theta}$$

where θ is a maximum inclination angle imposed by the marine conditions. More preferably, dimensions $L_{c1}$ and $L_{c2}$ of a compartment range between 100 and 1000 mm.

According to an embodiment of the invention, each wall 6 of upper level N1 contains a single perforation 7. Furthermore, according to this embodiment, in order to prevent linear fluid flow and to provide good radial dispersion of the liquid in upper level N1, perforations 7 of two parallel walls of a distribution compartment 13 of the upper level are preferably not aligned (or coaxial), is a line passing through the centers of perforation of two parallel walls of upper level N1 is not parallel to one of the walls of compartment 13 of upper level N1. Advantageously, perforations 7 are arranged in the lower part of walls 6 of upper level N1, to always be positioned below the liquid guard height.

The number of compartments per collection and distribution level (and therefore the number of walls per distribution level) can depend on the diameter of the tray. Preferably, a tray of large size has more partitions than a tray of smaller size.

According to a variant embodiment of the invention, at least one of the following features can be used:
  Compartments 13 and 14 of upper level N1 and their symmetrical compartments 15 and 16 in lower level N2 can comprise gas passage chimneys 4,
  The compartments of upper level N1, and therefore those of lower level N2, have a triangular shape and for this embodiment, there can be three series of walls in each level with the walls of one series being parallel to one another and intersecting the walls of the other series;

The compartments of upper level N1 and therefore those of lower level N2 have a hexagonal shape (of honeycomb type for example);

Perforations 7 of two opposite sides of a compartment 13 and 14 of upper level N1 are aligned; and Each wall 6 of upper level N1 comprises perforations 7.

Figure 8:
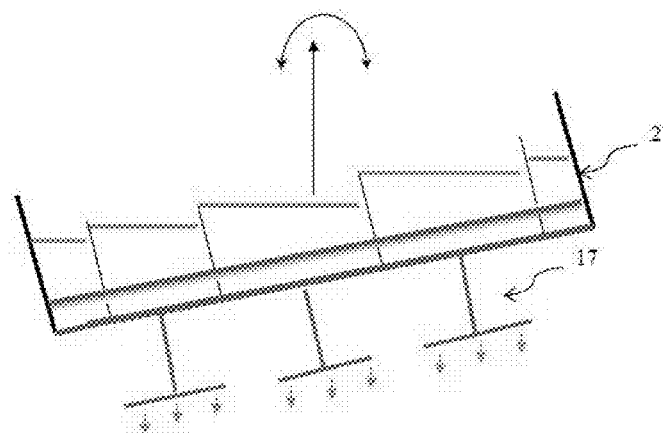
FIG. 8 illustrates another embodiment of the distributor tray according to the invention.

Furthermore, according to a variant embodiment of the invention, distributor tray 2 can comprise a secondary liquid distribution system (FIG. 8). The secondary distribution system projects from the lower face of the tray and distributes the liquid onto the packing the liquid coming from the means for passing liquid. The secondary distribution system improves the liquid distribution quality by orienting the distribution of liquid on the packing. According to a particular embodiment of the invention, the secondary distribution system can comprise deflectors 17 that orient the distribution of liquid. Alternatively, the secondary distribution system can comprise a set of sprinklers (assembly of several lines arranged in parallel and provided with orifices), chimneys projecting from the lower part of the distributor tray and/or a set of perforated lines arranged in parallel below the distributor tray.

Figure 9:
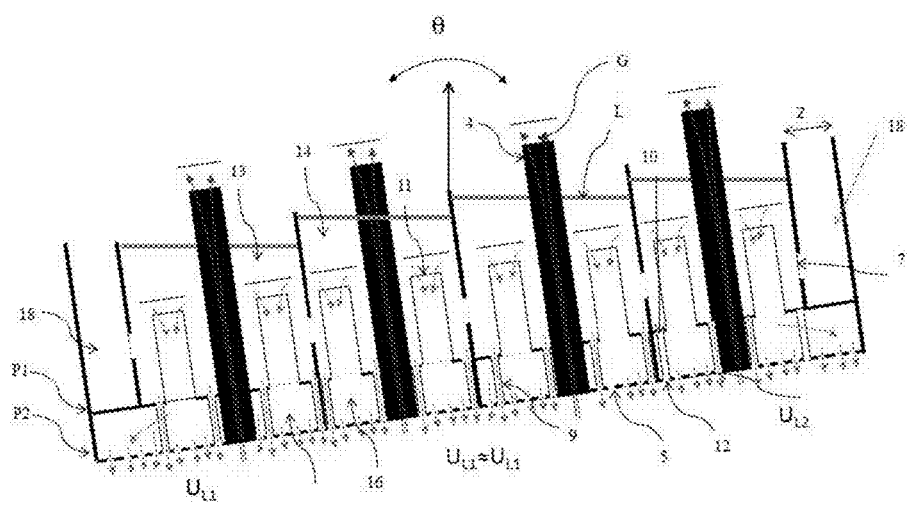
FIG. 9 illustrates another embodiment of the distributor tray according to the invention.

Moreover, according to a variant embodiment of the invention, upper level N1 of distributor tray 2 comprises at least one retention compartment 18 (FIG. 9). A retention compartment has walls 6 arranged in the upper level and it comprises no means for passing liquid. Preferably, retention compartment 18 comprises no means for passing gas through the tray. Walls 6 of retention compartments 18 are also perforated. According to the invention, retention compartments 18 are arranged on the periphery of upper level N1 of tray 2. According to an aspect of the invention, all the compartments on the periphery of upper level N1 of tray 2 are retention compartments 18 and the other compartments are distribution compartments 13 and 14. A retention compartment allows liquid accumulation and decrease in liquid to be attenuated when oscillations induced by tray motions resulting from the marine environment occur. Therefore, good liquid distribution quality is provided.

For all the embodiments of the invention, the dimensions of the tray and of its components can match the following intervals:

Pitch P of gas chimneys 4 ranges between 50 and 500 mm and preferably is between 100 and 300 mm;

The height of distributor tray 2 ranges between 100 and 2000 mm and preferably is between 600 and 1000 mm;

The diameter of tray 2 ranges between 300 and 10,000 mm;

If elements 4 have a cylindrical shape, the diameter $d_c$ ranges between 50 and 500 mm;

The height of chimneys 4 ranges between 300 and 2000 mm and preferably between 400 and 700 mm, The minimum distance to the edge of chimneys 4 ranges between 50 and 400 mm, and preferably ranges between 100 and 200 mm;

The height of walls 6 ranges between 100 and 2000 mm and preferably ranges between 700 and 1000 mm;

Diameter $d_{or}$ of perforations 7 ranges between 5 and 100 mm and preferably ranges between 30 and 50 mm;

The width Z of the retention compartments ranges between 40 and 300 mm.

These different variant embodiments of the distributor tray according to the invention can be combined and notably the variant embodiments of FIGS. 5 and 8 and for example, chimneys 11 can be connected to deflectors 12.

Figure 10:
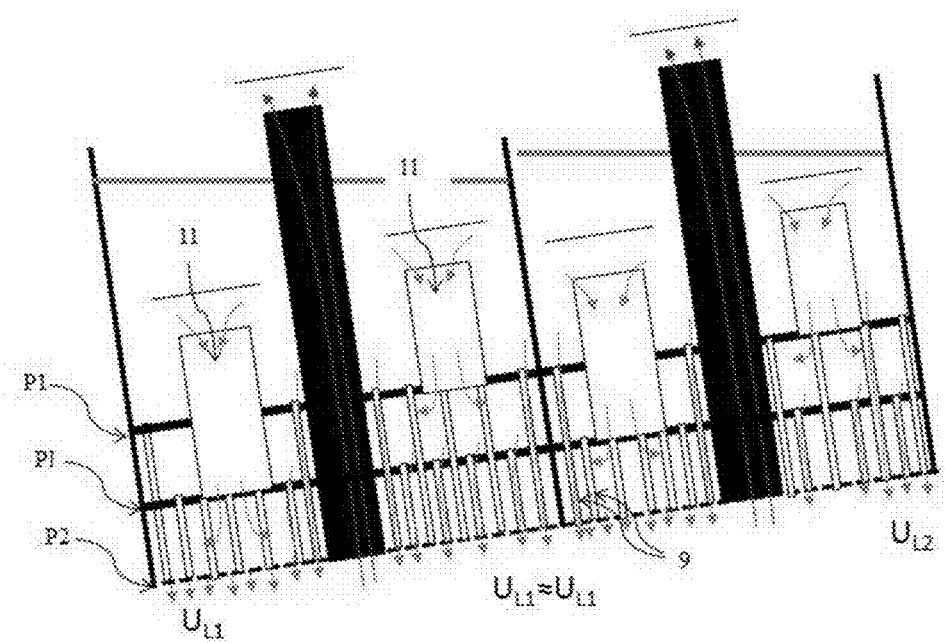
FIG. 10 illustrates another embodiment of the distributor tray according to the invention.

According to a particular embodiment of the present invention, the distributor tray comprises a third plate (FIG. 10), referred to as intermediate plate P1, arranged between the upper P1 and lower P2 plates, which also comprises two distinct means for passing of the liquid. In this case, the means for passing liquid having an upper opening (11) can project not only from upper plate P1 but also from intermediate plate P1, and some supply lines 9 can distribute the liquid from upper plate P1 to lower plate P2, while other lines 9 can distribute the liquid from intermediate plate P1 down to lower plate P2.

The invention also relates to a column 1 intended for material and/or heat exchange between two fluids, wherein two fluids are contacted by means of a gas/liquid contactor column 3 comprising at least a first inlet for a liquid fluid, at least a second inlet for a gaseous fluid, at least a first outlet for a gaseous fluid and at least a second outlet for a liquid fluid. Column 1 furthermore comprises a distributor tray 2 as described above for distributing the fluids on contactor 3.

Column 1 is advantageously an amine washing column but it is suited to any type of solvent.

Advantageously, gas/liquid contactor 3 is a structured or random packed bed.

Furthermore, the invention relates to an offshore floating barge, notably of FPSO or FLNG type, notably for hydrocarbon production and processing. The barge comprises a column intended for material and/or heat exchange between a gas and a liquid as described above. The column can belong to a gas treatment and/or $CO_2$ capture unit for cleaning produced gases (or fumes).

The column according to the invention can be used in gas treatment, $CO_2$ capture, distillation or air conversion processes.

Comparative Example

In order to illustrate the advantages of the present invention, the results obtained with the invention (embodiment of FIG. 4) and those obtained with a distributor tray according to the prior art as described in French patent application 2,989,595 corresponding to U.S. published application 2013/277,868 are compared.

The properties of the trays according to the invention and according to the prior art are described hereafter:

Properties of the Tray According to the Prior Art
number of distribution levels: 1
number of compartments: 120
diameter of the distributor tray: 4000 mm
diameter of the gas chimneys: 100 mm
height of the gas chimneys: 600 mm
number of gas chimneys: 120
length of distribution compartments $L_{c1} \times L_{c2}$: 300×300 mm
wall aperture: approximately 1%
liquid flow rate in nominal mode: 100 m$^3$/m$^2$/h
liquid flow rate in turn-down mode: 40 m$^3$/m$^2$/h.

Properties of the Tray According to the Invention (FIG. 4)
number of distribution levels: 2
number of compartments per distribution level: 120
diameter of the distributor tray: 4000 mm
diameter of the gas chimneys: 100 mm
height of the gas chimneys: 600 mm
number of gas chimneys: 120
length of distribution compartments $L_{c1} \times L_{c2}$: 300×300 mm wall aperture: approximately 1% liquid flow rate in nominal mode: 100 m³/m²/h liquid flow rate in turn-down mode: 40 m³/m²/h.

A numerical approach of CFD (Computational Fluid Dynamics) type is used which studies the motion of a fluid through the numerical solution of mass conservation and momentum balance equations (Navier-Stokes equations). The numerical approach used is an interface tracking type (Volume of Fluid VOF) as described in Hirt & Nichols, JCP 39, 201-225 (1981). This method, which is well known, is suited for simulating the change in interface topology encountered in the distributor subjected to wave motion (detachment, interface reconnection, breaker formation, ... ). The evolution of the two-phase flow is described by the mass conservation and momentum conservation equations, and by the presence rate transport equation. Calculations were carried out with the commercial software Fluent 14.5 ® (ANSYS, USA).

For all the CFD evaluation calculations presented hereafter, the angle associated with the simulated roll motion is +/−5° with a 15 s period. The properties of the fluids are: $\rho_L$=1000 kg/m3, $\mu_L$=1 cP, $\rho_G$=1.2 kg/m3, $\mu_G$=0.018 cP. A distance to the gyration point of the offshore platform of 50 m is taken into account in the calculations. This distance corresponds to the distributors arranged at the top of the column which are subjected to the highest accelerations. Finally, the capillary effects are assumed to be negligible.

It should be noted that the distribution efficiency of the system of the invention is compared with that of a distributor tray according to the prior art in cases where the tray undergoes wave motions. In order to quantify the sensitivity of the tray to the marine environment, an imbalance index IQ (expressed in percentage) defined by a formula of the type as follows can be calculated:

$$IQ(\%) = \frac{q_{L,max} - q_{L,min}}{q_{L,moyen}} \times 100$$

with: $q_{L,max}$ being the maximum flow rate of liquid flowing from one of the distributor compartments, $q_{L,min}$ being the minimum flow rate of liquid flowing from one of the distributor compartments and $q_{L,moyen}$ being the average flow rate of liquid flowing from the distributor. A low value of the liquid imbalance index indicates a low sensitivity of the distribution to the effects of the wave motion. On the other hand, a high IQ index value indicates a great distribution imbalance.

Figure 7:
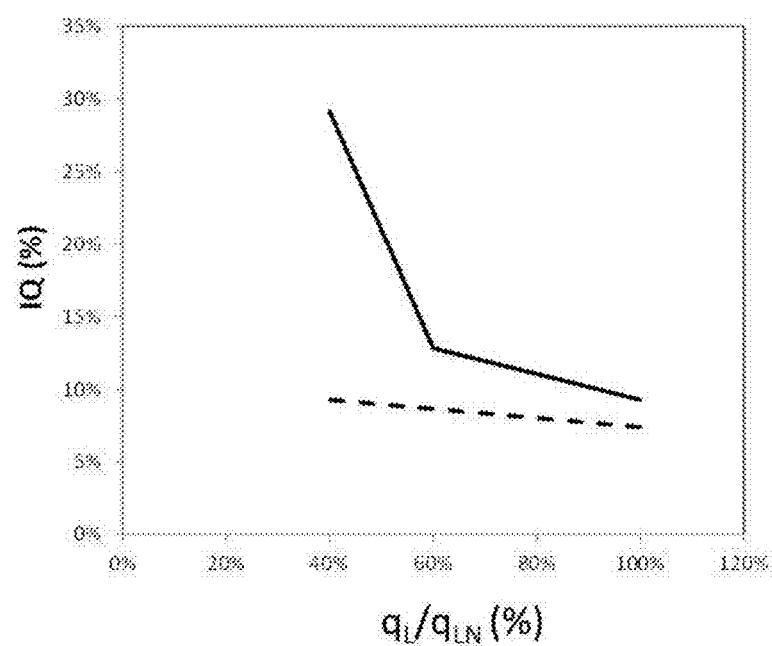
FIG. 7 is a comparative curve between a distributor tray according to the invention and a distributor tray according to the prior art.

FIG. 7 compares, for the two distributor trays, the evolution of imbalance index IQ, averaged over an oscillation period, as a function of the normalized liquid flow rate ($q_L$) to the liquid flow rate in nominal mode ($q_{LN}$). Thus, a high $q_L/q_{LN}$ ratio corresponds to an operation close to nominal mode operation (liquid flow rates in optimum operating mode, approximately 80% of the operating time of the unit) and a low $q_L/q_{LN}$ ratio indicates an operation predominantly in turn-down mode (low liquid flow rates).

For the distributor tray according to the prior art French patent 2,989,595 corresponding to U.S. published application 2013/277,868, the average imbalance index (solid line curve) increases substantially with the liquid flow rate decrease, which indicates low flexibility. Indeed, the distribution quality is substantially degraded (IQ=29%) in turn-down mode operation.

The distributor tray according to the present invention (dotted line curve) provides a better distribution quality that remains stable with solvent flow rate decrease, which indicates very good flexibility. Indeed, the average imbalance index remains below 10% in turn-down mode operation. This example shows that the invention improves the distribution efficiency in a floating environment. It can also be noted that, at 100% of the nominal flow rate, the average imbalance index is better with a distributor according to the invention which is due to a higher liquid guard height at the nominal flow rate in the distributor of the invention.

The invention claimed is:

1. A distributor tray for a gas, liquid, heat or material exchange column comprising:
   means for passing gas through the tray, the tray comprising an upper plate and a lower plate with each plate comprising at least two means for passing liquid through the plate, openings in the upper plate positioned at different heights, and at least one of the means for passing liquid of the upper plate having an opening at a lower height communicating with a passage for passing liquid through the lower plate through a supply line, and wherein the means for passing gas are gas distribution chimneys projecting from an upper face of the lower plate and a height of the means for passing liquid of the upper plate have an opening at a highest height that is less than a height of the gas distribution chimneys.

2. A tray as claimed in claim 1, wherein:
   the means for passing liquid through the upper plate comprise at least one chimney projecting from an upper face of the upper plate.

3. A tray as claimed in claim 1 wherein:
   the means for passing liquid through the upper and lower plates which communicate through the supply line comprise orifices provided in the plates.

4. A tray as claimed in claim 1, wherein:
   one of the means for passing the liquid through the upper plate comprise orifices provided in the upper plate.

5. A tray as claimed in claim 1, wherein:
   the means for passing gas are distribution elements having a cylindrical, cubic or parallelepipedic shape.

6. A tray as claimed in claim 1, comprising:
   a space formed above an upper level of the upper plate, which is divided into compartments by at least one wall which is perpendicular to an upper face of the upper plate, the at least one wall of the upper level comprises at least one perforation allowing part of the liquid to flow between the compartments of the upper level, and wherein a closed space is contained between the upper and lower plates at a lower level which is divided into compartments by at least one wall.

7. A tray as claimed in claim 6, wherein the upper level of the tray comprises non-parallel walls.

8. A tray as claimed in claim 7, wherein the non-parallel walls of the upper level comprise first and second series of walls with the walls of each series being parallel to each other and not being parallel to walls of the other series.

9. A tray as claimed in claim 7, wherein walls of the lower level are symmetrical to the walls of the upper level.

10. A tray as claimed in claim 8, comprising perforations which are not aligned and two parallel walls of the upper level which define a single compartment.

11. A tray as claimed in claim 10, wherein the perforations are located at a base of walls of the upper level.

12. A tray as claimed in claim 6, wherein a height of the at least one wall of the upper level is at least equal in height to the means for passing gas in the upper level.

13. A tray as claimed in claim 6, wherein a maximum distance between consecutive walls of the upper level ranges between 100 and 1000 mm.

14. A tray as claimed in claim 6, wherein the upper level comprises at least one retention compartment disposed at a periphery of the tray.

15. One of a gas/liquid heat and a material exchange column comprising a tray in accordance with claim 1 wherein two fluids are distributed in the column by the tray and contact a packing and that two fluids are distributed onto the packing.

16. A floating barge, for hydrocarbon recovery carrying at least one column in accordance with in claim 15.

17. A tray as claimed in claim 15, which treats a gas, captures $CO_2$, performs a distillation or an air conversion process.

18. A tray as claimed in claim 8, wherein walls of the lower level are symmetrical to the walls of the upper level.

* * * * *